United States Patent
Takahashi

(10) Patent No.: US 7,423,719 B2
(45) Date of Patent: Sep. 9, 2008

(54) OPTICAL FILM USING DIFFRACTION GRATING AND DISPLAY DEVICE USING THE SAME

(75) Inventor: Susumu Takahashi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/942,731

(22) Filed: Aug. 31, 2001

(65) Prior Publication Data

US 2002/0036731 A1    Mar. 28, 2002

(30) Foreign Application Priority Data

Aug. 31, 2000    (JP)    ............... 2000-264438

(51) Int. Cl.
  *G02F 1/13*    (2006.01)
  *H01L 29/15*    (2006.01)

(52) U.S. Cl. ............ 349/201; 349/202; 349/113; 349/82; 257/79; 257/80; 257/81

(58) Field of Classification Search ......... 349/201, 349/202, 113, 62, 64, 67, 82, 84; 257/79–103
See application file for complete search history.

(56) References Cited

U.S. PATENT DOCUMENTS

| | | | | |
|---|---|---|---|---|
| RE26,506 E | * | 12/1968 | Rogers ............... | 350/157 |
| 5,122,888 A | * | 6/1992 | Iizuka et al. ......... | 349/200 |
| 5,301,062 A | | 4/1994 | Takahashi et al. .... | 359/567 |
| 5,506,701 A | | 4/1996 | Ichikawa | |
| 5,602,679 A | * | 2/1997 | Dolgoff et al. ....... | 359/640 |
| 5,731,858 A | | 3/1998 | Hisatake et al. | |
| 5,808,784 A | | 9/1998 | Ando et al. | |
| 5,900,982 A | * | 5/1999 | Dolgoff et al. ....... | 359/619 |
| 6,075,581 A | | 6/2000 | Shirochi | |
| 6,088,076 A | * | 7/2000 | Ogawa et al. ........ | 349/106 |
| 6,118,516 A | * | 9/2000 | Irie et al. ............ | 355/53 |
| 6,118,586 A | * | 9/2000 | Tanabe et al. ........ | 359/566 |
| 6,147,802 A | * | 11/2000 | Itoh et al. ............ | 359/500 |
| 6,271,966 B1 | * | 8/2001 | Tanabe et al. ........ | 359/566 |
| 6,445,500 B1 | * | 9/2002 | Itoh .................. | 359/487 |

(Continued)

FOREIGN PATENT DOCUMENTS

JP    56-51772    5/1981

(Continued)

OTHER PUBLICATIONS

Ronald W. Waynant and Marwood N. Ediger Electro-Optics handbook (McGraw-Hill), pp. 2.14-2.17 (1994) (copies given to AR Olenginski at Interview).*

(Continued)

*Primary Examiner*—Howard Weiss
*Assistant Examiner*—Steven H Rao

(57) ABSTRACT

An optical diffusion film comprises a plurality of diffraction grating cells formed on a substrate, each cell comprising a plurality of curved gratings disposed in parallel with each other and containing the same profile. Such film can be manufactured by embossing, using an original plate formed by etching a photosensitive material by means of an electronic beam exposure system to produce gratings. When such a film is provided with a reflection layer and exposed to light coming obliquely from above, highly bright and diffracted light is emitted in a predetermined direction.

29 Claims, 9 Drawing Sheets

U.S. PATENT DOCUMENTS

| | | | |
|---|---|---|---|
| 6,587,275 B2 * | 7/2003 | Lee et al. | 359/620 |
| 2002/0036731 A1 * | 3/2002 | Takahashi et al. | 349/112 |
| 2003/0076423 A1 * | 4/2003 | Dolgoff | 348/222.1 |
| 2003/0128917 A1 * | 7/2003 | Turpin et al. | 385/24 |
| 2003/0151784 A1 * | 8/2003 | Kitamura et al. | 359/3 |
| 2003/0197906 A1 * | 10/2003 | Furuta et al. | 359/15 |

FOREIGN PATENT DOCUMENTS

| | | | |
|---|---|---|---|
| JP | 64-81633 | * | 3/1989 |
| JP | 5-100201 | * | 4/1993 |
| JP | 8-505716 | | 6/1996 |
| JP | 1997-000066 | * | 1/1997 |
| JP | 9-152586 | | 6/1997 |
| JP | 9-178949 | | 7/1997 |
| JP | 9-222512 | | 8/1997 |
| JP | 9-510029 | | 10/1997 |
| JP | 11-125707 | | 5/1999 |
| JP | 11-202112 | | 7/1999 |
| JP | 11-202793 | | 7/1999 |
| JP | 11-287991 | | 10/1999 |
| JP | 11-326618 | | 11/1999 |
| JP | 2000-39508 | | 2/2000 |
| JP | 2000-106021 | | 4/2000 |
| JP | 2000-266914 | | 9/2000 |
| JP | 2001-116908 | | 4/2001 |
| KR | 1999-0064007 | | 7/1999 |
| TW | 275109 | | 5/1996 |
| TW | 324791 | | 1/1998 |

OTHER PUBLICATIONS

Gregory p. Behrmann et al., "Excimer laser micromachining for rapid fabrication of diffractive optical elements" Applied optics, vol. 36, No. 20, Jul. 10, 1997.( copies given to AR Olengenskia t interview).*

E. Pawlowski "Thin film depostion: an alternative technique for the fabrication of bianry optics with high efficiency" ( copies given to AR Olengenski at interview).*

Taiwanese Office Action mailed Apr. 11, 2005 cited in corresponding Taiwanese Application No. 090121640.

European Search Report dated Oct. 12, 2006, for related European Patent Application No. EP 01 961 204.3-1234.

Korean Patent Office Action, mailed Apr. 8, 2008 and issued in corresponding Korean Patent Application No. 10-2002-7005537.

* cited by examiner

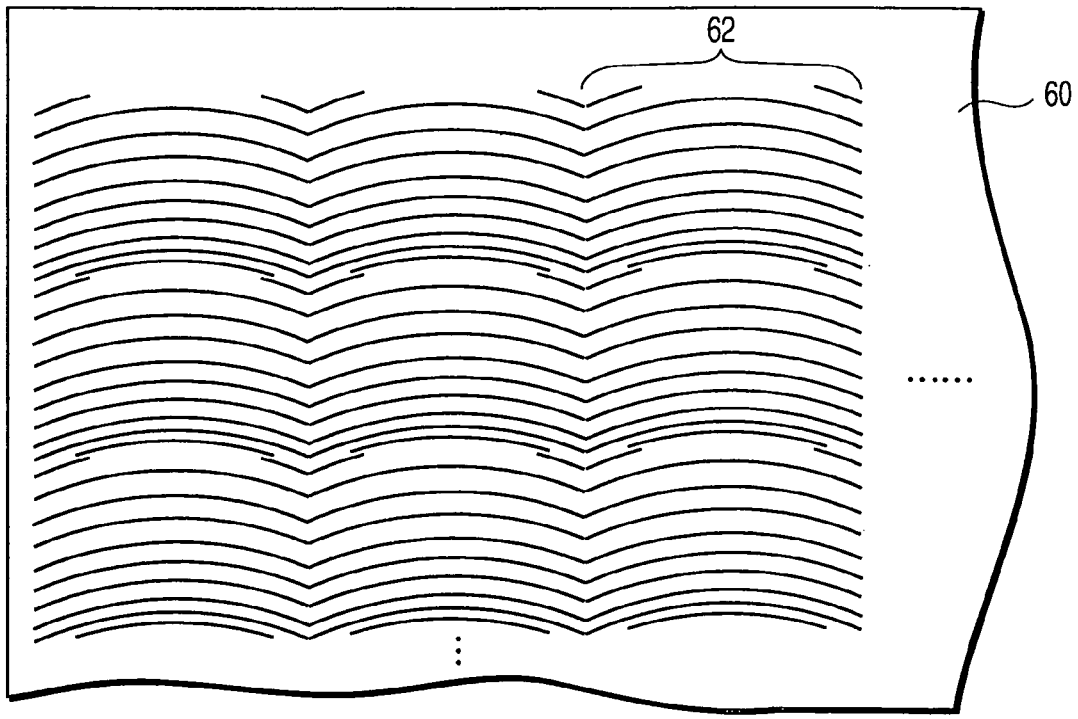
FIG. 15
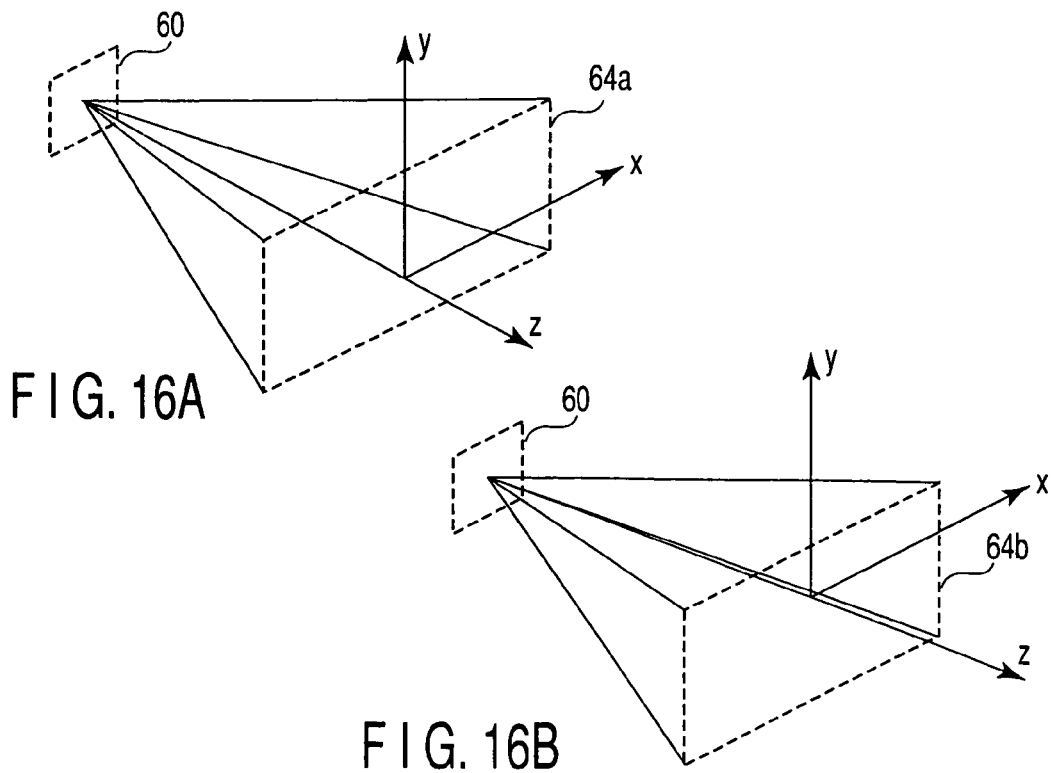
FIG. 16A
FIG. 16B

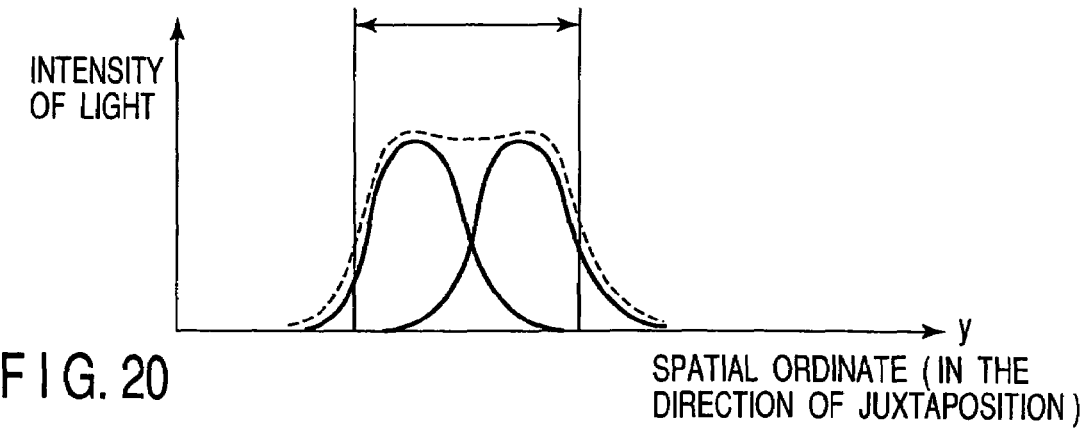
FIG. 20  SPATIAL ORDINATE (IN THE DIRECTION OF JUXTAPOSITION)
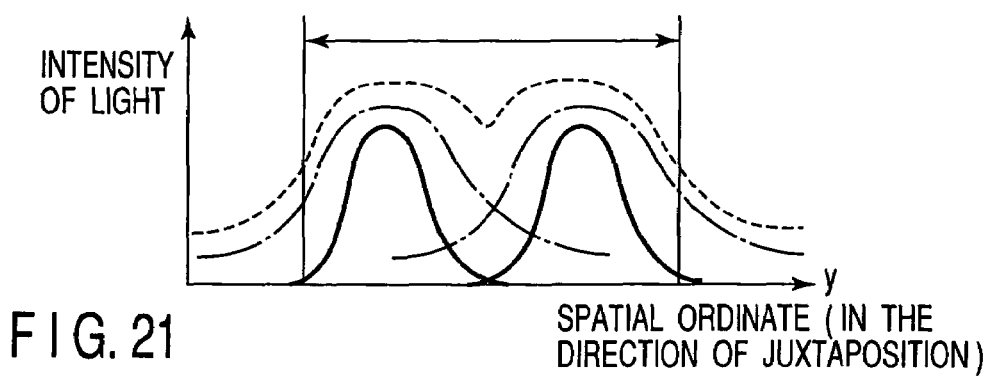
FIG. 21  SPATIAL ORDINATE (IN THE DIRECTION OF JUXTAPOSITION)
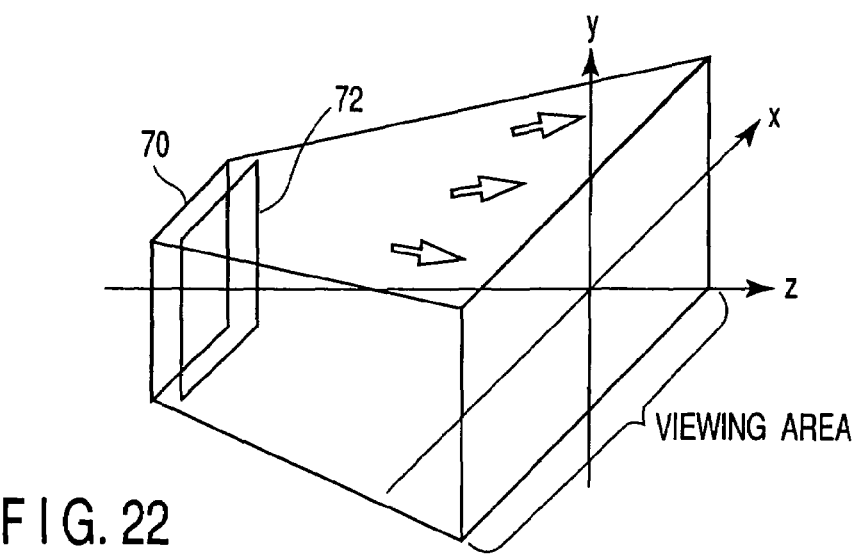
FIG. 22

OPTICAL FILM USING DIFFRACTION GRATING AND DISPLAY DEVICE USING THE SAME

CROSS-REFERENCE TO RELATED APPLICATIONS

This application is based upon and claims the benefit of priority from the prior Japanese Patent Application No. 2000-264438, filed Aug. 31, 2000, the entire contents of which are incorporated herein by reference.

BACKGROUND OF THE INVENTION

1. Field of the Invention

This invention relates to an optical film using diffraction grating and a display device using the same.

2. Description of the Related Art

Display devices to which such an optical film is applicable include the following.

(1) Transmission type liquid crystal display devices requiring a light source such as a back light unit.

In a transmission type liquid crystal display device, a liquid crystal panel is illuminated at a back side (the side opposite to the side of viewers) or a lateral side with light emitted from a light source such as a back light unit or an edge light unit and a pattern produced on the liquid crystal panel is displayed by emitted light.

With such a display device, an optical film such as a diffusion film or a prism film is used to control illuminating light so that it may irradiate the entire surface of the liquid crystal panel uniformly or in a given direction.

When a back light unit is used, a simple diffusion film will simply diffuse light isotropically so that light cannot be converged to a necessary area of observation to make it impossible to utilize light effectively. On the other hand, a prism film has disadvantages such as a large thickness and being unfoldable.

(2) Reflection type liquid crystal display devices not requiring the use of a light source such as a back light unit.

A reflection type liquid crystal display device comprises a reflector at a rear side of the liquid crystal panel (the side opposite to the side of the viewers) and does not require any particular light source. It is for utilizing environmental light (room illuminations, sun light and/or other external light) to display a pattern produced on the liquid crystal panel.

A display device of this type utilizes any of the optical films listed below in order to control a view area (an area in which display light can be properly sensed by the visible sense) of the viewers.

(a) A diffusion film arranged on a front surface (at the side of the viewers) of the liquid crystal panel in order to scatter reflected light to be used as display light. The diffusion film preferably does not scatter incident light to the liquid crystal panel and but scatters light reflected by the back surface thereof to emit toward the viewers from the liquid crystal panel as display light.

(b) A reflection film arranged on the rear surface (at the side opposite to the side of the viewers) of the liquid crystal panel in order to control the direction and area of reflection of reflected light to be used as display light. While scattering reflector panels (metal plates having an undulated surface) are mainly used as reflection films, they have been partly replaced by hologram films in recent years.

Known reflection type liquid crystal display devices utilizing a hologram film as reflector panel include those disclosed in the following patent documents.

(1) Jpn. Pat. Publication (KOKAI) No. 56-51772
(2) Jpn. Pat. Publication (KOHYO) No. 8-505716
(3) Jpn. Pat. Publication (KOKAI) No. 9-152586
(4) Jpn. Pat. Publication (KOKAI) No. 9-222512
(5) Jpn. Pat. Publication (KOHYO) No. 9-510029

Various types of hologram are known and reflector panels comprising a hologram film show different characteristics depending on the type of hologram used therein.

The patent document (1) discloses the use of a surface relief type hologram having a diffusion pattern (hologram) of shallow gratings as interference fringes. The fringes provide a low contrast and it is difficult to raise a diffraction efficiency. Therefore, it is difficult for viewers to visually sense a bright display pattern and the sensed colors can change depending on a viewing angle because of a color dispersing effect of hologram.

The patent documents (2) and (3) disclose the use of a volume phase reflection type hologram that can reflect and diffract light only in a limited range of wavelength (and hence only of particular colors) because of its wavelength selectivity. Therefore, it is difficult to provide a bright display pattern that can be sensed over the entire wavelength range of visible light.

The patent documents of (4) and (5) disclose the use of a volume phase transmission type hologram that can provide a bright display pattern over the entire wavelength range of visible light (as known to those skilled in the art in the field of technology and hence will not be described in greater detail). However, it is difficult to make all light coming from a reflection layer arranged on the rear surface to work for diffraction (the reflector panel comprising a volume phase transmission type hologram and a reflection layer) and hence to cause a bright display pattern to be visually sensed because of an angle selectivity of a volume phase transmission type hologram.

Additionally, the volume type holograms recited in the documents (2), (3), (4) and (5) are made of a photosensitive material and hence costly. They are also accompanied by a problem of durability.

The use of hologram is also known for diffusion films described in the above (a). In order to prepare such a diffusion film showing a hologram, a light diffusing object such as frosted glass is photographically recorded on a hologram.

However, when photographically recording a light diffusing object on a hologram, a laser beam is made to irradiate a frosted glass that is to be photographed. Then, a projected pattern formed by light transmitted through or reflected by an object to be photographed (object light) inevitably involves a random noise referred to as a speckle pattern. Since the hologram is produced by recording a pattern formed as a result of interference of the projected pattern (object light) and a reference light, the recorded interference fringes show a poor contrast because of the fluctuations in intensity that are caused by a speckle pattern. Therefore, it is a general practice to improve the diffraction efficiency by using a volume phase type hologram such as a photopolymer.

However, a volume phase type hologram is formed by using a photosensitive material that can hardly withstand environmental changes in terms of temperature and humidity and has a large thickness. Thereby, a volume phase type hologram is colored due to absorption of light and is costly as in the case of the use of a reflector panel.

Meanwhile, Jpn. Pat. Publication (KOKAI) No. 11-287991 proposes a reflection type display device as a solution to the problem that known reflection type display devices show a poor efficiency for utilization of light and a poor intensity of light emitted toward the viewers (to display only a dark image) because light reflected by the scattering reflector panel is scattered in every direction.

The proposed reflection type display device comprises a directional reflector panel arranged on the rear surface of a transmission type display member and adapted to reflect incident light coming from the front side of the transmission type display member in a predetermined direction with a spreading angle smaller than the incident angle and a light diffusion member having a geometrical optics effect and arranged at least one of on the front surface of the transmission type display member and at a position between the rear surface of the transmission type display member and the front surface of the directional reflector panel. With this arrangement, the displayed image can be made sufficiently bright when viewed from a given angle and a wide angle of viewing field can be realized.

Meanwhile, the diffusion member having a geometrical optics effect normally has large dimensions with a large thickness and is heavy and costly, which are problems to be solved. Although a scatter panel (diffusion panel) may have a relatively simple configuration among various diffusion members having a geometrical optics effect, it is difficult to control the light emission range.

BRIEF SUMMARY OF THE INVENTION

It is an object of the present invention to provide an optical film utilizing a diffraction effect of light and showing a high efficiency for utilizing light.

Another object of the present invention is to provide an optical film for utilizing a diffraction effect so as to appropriately select the light emission range (view area) thereof.

Still another object of the present invention is to provide an optical film for utilizing a diffraction effect so as to make a distribution of intensity of light uniform in the view area.

According to one aspect of the present invention, there is provided an optical film comprising diffraction grating cells arranged in a matrix, each cell comprising blazed type or binary type curved gratings.

According to another aspect of the present invention, there is provided an optical film comprising diffraction grating cells arranged in a matrix, each cell comprising curved gratings, wherein the gratings include at least two grating pitches.

According to another aspect of the present invention, there is provided a display device comprising a liquid crystal display layer which forms an image to be displayed; and a light reflecting optical film which is arranged on a rear surface of the liquid crystal display layer and comprises diffraction grating cells arranged in a matrix, each cell comprising blazed type or binary type curved gratings.

According to another aspect of the present invention, there is provided a display device comprising a liquid crystal display layer which forms an image to be displayed; and a light transmission optical film which is arranged on a front surface of the liquid crystal display layer and comprises diffraction grating cells arranged in a matrix, each cell comprising blazed type or binary type curved gratings.

According to another aspect of the present invention, there is provided a display device comprising a liquid crystal display layer which forms an image to be displayed; and a light reflecting optical film which is arranged on a rear surface of the liquid crystal display layer and comprises diffraction grating cells arranged in a matrix, each cell comprising curved gratings, wherein the gratings include at least two grating pitches.

According to another aspect of the present invention, there is provided a display device comprising a liquid crystal display layer which forms an image to be displayed; and a light transmission optical film which is arranged on a front surface of the liquid crystal display layer and comprises diffraction grating cells arranged in a matrix, each cell comprising curved gratings, wherein said gratings are arranged by at least two pitches.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 15 is a schematic front view of an example of a grating pattern of an optical diffusion film according to a third embodiment of the present invention;

FIG. 16A and FIG. 16B are schematic illustration of the range of emission of primary diffracted light for two different wavelengths from a cell of the optical diffusion film according to the third embodiment;

FIG. 20 is a graph illustrating the distributions of primary diffracted light from two cells when the difference in the interval of the diffraction gratings of optical diffusion film according to the fourth embodiment is less than the value corresponding to the half-width of light diffracted by the cell itself;

FIG. 21 is a graph illustrating the distributions of primary diffracted light from two cells when the difference in the interval of the diffraction gratings of the optical diffusion film according to the fourth embodiment is less than the value corresponding to the full-width of light diffracted by the cell itself;

FIG. 22 is a schematic perspective view of a display device according to a fifth embodiment of the present invention;

DETAILED DESCRIPTION OF THE INVENTION

An embodiment of an optical film and a display device having the same according to the present invention will now be described with reference to the accompanying drawings.

First Embodiment

Figure 1:
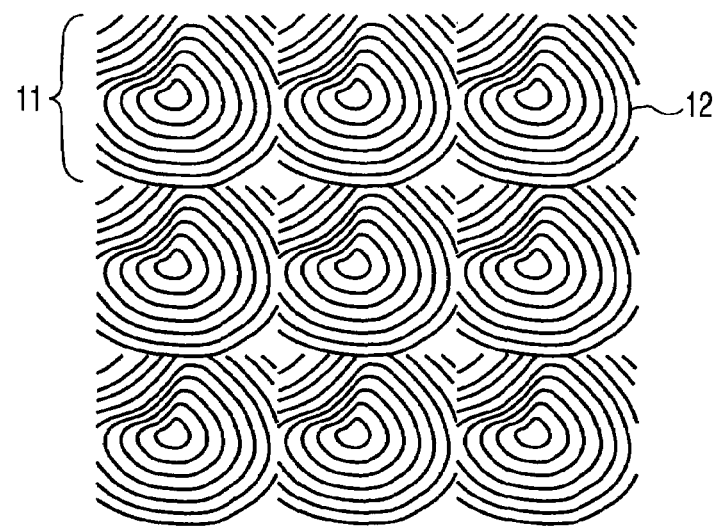
FIG. 1 is a schematic front view of an example of a grating pattern of an optical diffusion film according to a first embodiment of the present invention.
Figure 2:
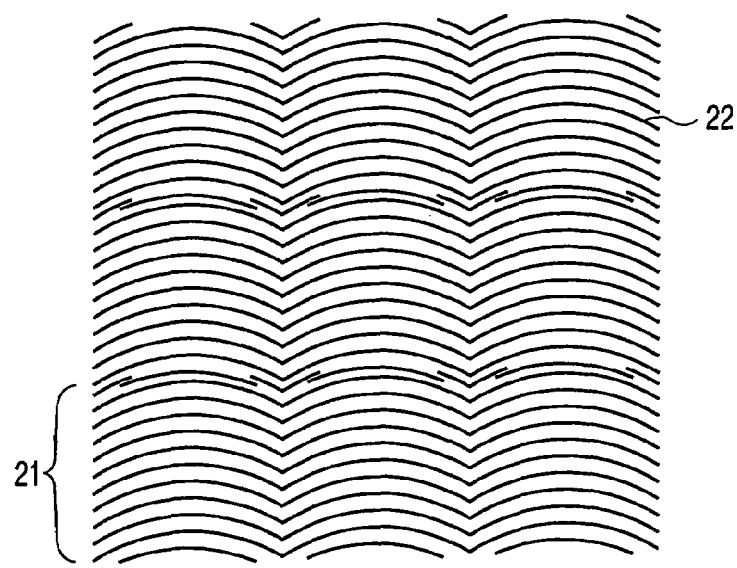
FIG. 2 is a schematic front view of another example of the grating pattern of the optical diffusion film according to the first embodiment of the present invention.

Referring to FIGS. 1 and 2, an optical film according to the first embodiment comprises a diffraction grating cell array formed by arranging fine diffraction grating cells 11, 21 in the form of a matrix. Each diffraction grating cell has a plurality of curved diffraction gratings 12, 22 and is adapted to diffuse light by means of a diffraction effect. Therefore, the optical film will be referred to as optical diffusion film hereinafter. A diffusion of light comprises a transmission type diffusion and a reflection type diffusion. Hence a transmission type optical film diffuses light by transmission, whereas a reflection type optical film or a transmission type optical film provided with a reflection layer diffuses light by reflection. Curved diffraction gratings are used for the purpose of controlling the view area by scattering light.

Preferably, the cells 11, 21 have such a size that they are not recognized when viewed by naked eyes and can fully exert a diffraction effect. More specifically, each side of the cell is between about 5 μm and about 300 μm.

The undulations of the gratings 12, 22 are preferably smaller than the wavelength of visible light in order to reduce a wavelength selectivity and raise an efficiency of utilization of light.

Each diffraction grating cell of a diffraction grating cell array operating as a unit component is simply required to diffuse light and hence has a very simple structure. It can be realized by means of surface relief type diffraction gratings with a shallow pattern. Unlike a structurally complex hologram (in which each grating shows a random cross sectional view resembling a sine curve), surface relief type diffraction gratings show little reduction in the diffraction efficiency. The surface relief type diffraction gratings comprise blazed type diffraction gratings having a saw-tooth like cross section for the grooves and binary type diffraction gratings showing a step like cross section for the grooves.

The blazed type diffraction gratings are diffraction gratings showing a saw-tooth like cross section. It is known that blazed type diffraction gratings provide a very high diffraction efficiency when the angle of reflection or refraction of incident light at the slopes thereof agrees with the angle of diffraction. The slopes of the saw-tooth are not symmetrically arranged. In other words, one is gentle, whereas the other is steep. The gentle slope is long while the steep slope is short. The steep slope may be vertical.

The binary type diffraction gratings are diffraction gratings that may be obtained by modifying the slopes of the saw-tooth of the blazed type diffraction gratings to horizontal steps. It is known that the binary type diffraction gratings provide a high diffraction efficiency comparable to the blazed type diffraction gratings. When the steep slope of the blazed type diffraction gratings is vertical, it can be produced by simply modifying the gentle slopes of the blazed type diffraction gratings to horizontal steps.

In order to make diffraction gratings to fully exert the effect of diffusing light by diffraction, it is desirable that the diffraction gratings 12, 22 are not interrupted in areas other than the outer peripheries of the cells 11, 21 (and hence continuous within the cells).

When irradiated with white light, diffraction gratings produce a spectrum of diffracted light like a rainbow because the diffraction angle varies as a function of wavelength. In other words, the colors of light from the optical diffusion film are dispersed and when they are recognized differently by two eyes of the viewer, he or she will have a strange feeling and easily become tired of seeing them. In the case of a display device for utilizing environmental light, the strongest component of light generally comes from above. Therefore, in the case of a reflection type display device, the dispersion of colors may not be recognized differently by two eyes of the viewer when the display device is irradiated with light coming obliquely from above if the diffraction gratings show a relationship as described below.

Figure 3:
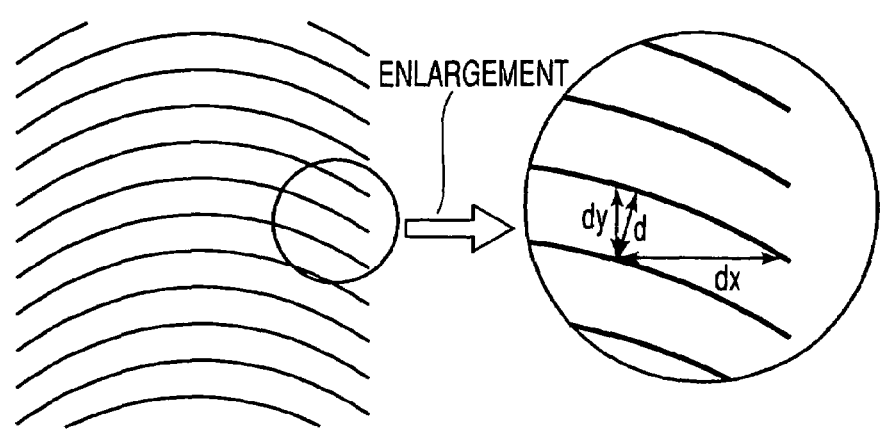
FIG. 3 is a schematic detailed front view of the optical diffusion film shown in FIG. 2.

It is assumed that the diffraction gratings are formed by arranging identical curved lines (in the form of a sector of a circle in FIG. 2) in parallel as shown in FIG. 2. FIG. 3 is an enlarged and detailed illustration of a single diffraction grating cell of FIG. 2 with a more enlarged partial view (a part surrounded by a circle along the right side). Assume here that the curved lines are separated at regular intervals of d in a given area and the interval d has a horizontal component $d_x$ and a vertical component $d_y$.

Assume that white light is made to strike the diffraction grating cell (the reflection type diffraction grating cell) from above at an angle of θ (a line normal to the drawing has an angle of 0°). When diffracted light having a wavelength λ goes out at angle $\alpha_x$ relative to the horizontal direction (from left to right) and angle $\alpha_y$ relative to the vertical direction (from above to below), theoretically, the following relations hold true.

$$\lambda = d_x \times \sin \alpha_x \qquad (1)$$

$$\lambda = d_y \times (\sin \theta + \sin \alpha_y) \qquad (2)$$

From these relationships, light with a wavelength λ goes out at a constant angle equal to the angular component $\alpha_y$ in the vertical direction if all the vertical intervals $d_y$ of the gratings are held to a constant value. Therefore, light going out from the diffraction grating cell constantly shows the same vertical angle regardless of the horizontal position if all the vertical intervals $d_y$ of the gratings are held to a constant value. Thus, the colors are held invariable in the horizontal direction and the same color is recognized by two eyes.

In order to make the interval $d_y$ between a grating and an adjacent grating show a constant value in the vertical direction to be equal in any area, the two gratings need to have the same and identical profile and arranged in parallel with each other.

When two gratings have the same and identical profile and are separated from each other by a constant interval $d_y$ in the y-direction, the interval separating them in the x-direction changes gradually at any point on the gratings and hence the angular component $\alpha_x$ in the horizontal direction also changes gradually at any point on the gratings. Therefore, it is possible to obtain diffracted light distributed only in the horizontal direction with a constant height in the vertical direction (diffraction angle $\alpha_x$) for light having a given wavelength. In other words, it is easily possible to emit diffracted light extending linearly in the horizontal direction that is perpendicular to the direction of juxtaposition of the gratings.

It is possible to obtain an optical diffusion film that shows little change of color of diffracted light in the horizontal direction by applying this relationship to all the gratings of a diffraction grating cell. Since an optical diffusion film comprising such diffraction grating cells shows little change of color in the horizontal direction, any color will not be recognized differently by two eyes of the viewer so that the viewer will be able to see the image without any strange feeling and hence will not become tired of seeing it. Additionally, since diffracted light provides a spectrum like a rainbow whose color changes in the vertical direction, it is possible to show a dynamic image having a high eye-catching effect.

However, a spectrum of light like that of a rainbow whose color changes in the vertical direction may not be desirable depending on the application of such an optical diffusion film. If such is the case, the moving distance of diffraction grating is changed. This means that the value of $d_y$ in the above relation (2) is changed. Then, colors with a plurality of different wavelengths are mixed at the viewing position to provide a color close to white. The moving distance $d_y$ preferably takes three or more than three different values because white color can be produced by mixing at least three primary colors of R, G and B.

Thus, according to the first embodiment, an optical diffusion film is formed of a plurality of diffraction gratings producing diffused light not of a hologram produced by photographically recording diffused light and therefore an optical diffusion film which is very bright is realized.

When forming an optical diffusion film by using the surface relief type diffraction gratings (blazed type diffraction gratings or binary type diffraction gratings), the following requirements need to be met in order to make the optical diffusion film a bright or clear one.

As described above, when the direction of regular reflection and the diffraction angle agree with each other on the slope of diffraction gratings, which may be blazed type diffraction gratings or binary type diffraction gratings, strong diffracted light is produced in the direction of the diffraction angle. An optical diffusion film according to this embodiment is required to scatter diffracted light and not to show any change of color in the horizontal direction. Therefore, strong diffracted light is produced in the direction (of regular reflection or the diffraction angle) when the angular components of the slope of the gratings are invariable.

Figure 5:
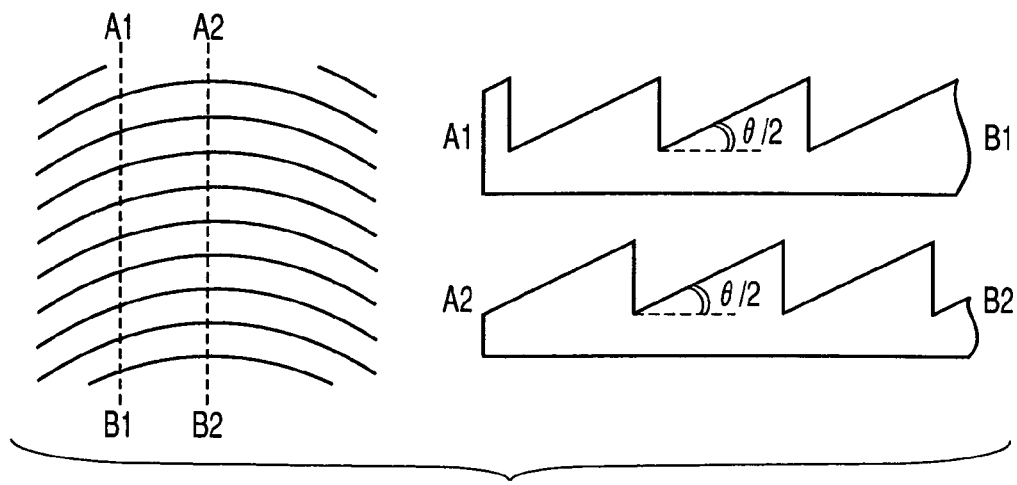
FIG. 5 is a schematic illustration of blazed type diffraction gratings according to the first embodiment.

This will be described in greater detail by referring to FIG. 5. FIG. 5 illustrates diffraction gratings formed by arranging identical curved lines in parallel as in FIG. 2 and FIG. 3.

Figure 4:
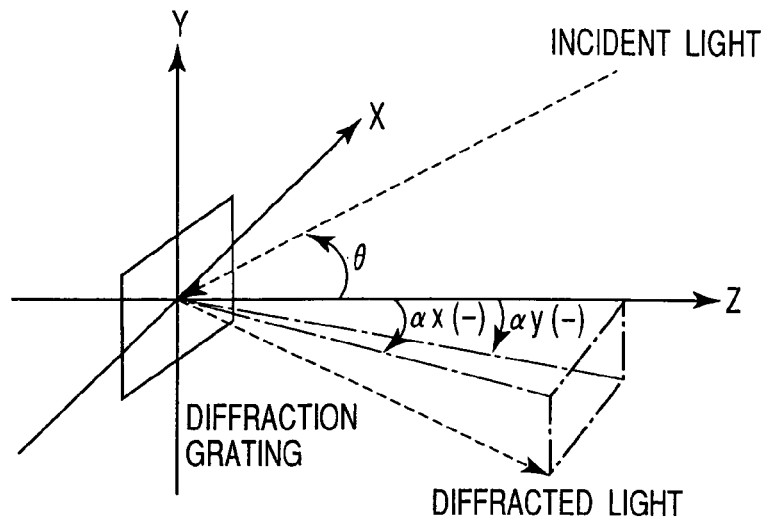
FIG. 4 is a schematic illustration of a diffraction of light of the first embodiment.

Assume that light (environmental light) is made to strike the diffraction gratings obliquely from above with an angle of θ as shown in FIG. 4. The slope of each grating needs to be inclined by an angle of θ/2 at any point on it in order to direct strong diffracted light toward the front surface of the display device. In FIG. 5, the cross sectional view taken along line A1-B1 and the one taken along line A2-B2 run in the direction along which identical curved lines are arranged in parallel. It will be appreciated that the slope of the gratings shows the same angle regardless of the line along which a cross sectional view is taken. The slope of the gratings can show the same angle by arranging the gratings with the same and identical intervals and making them show the same depth.

Figure 6:
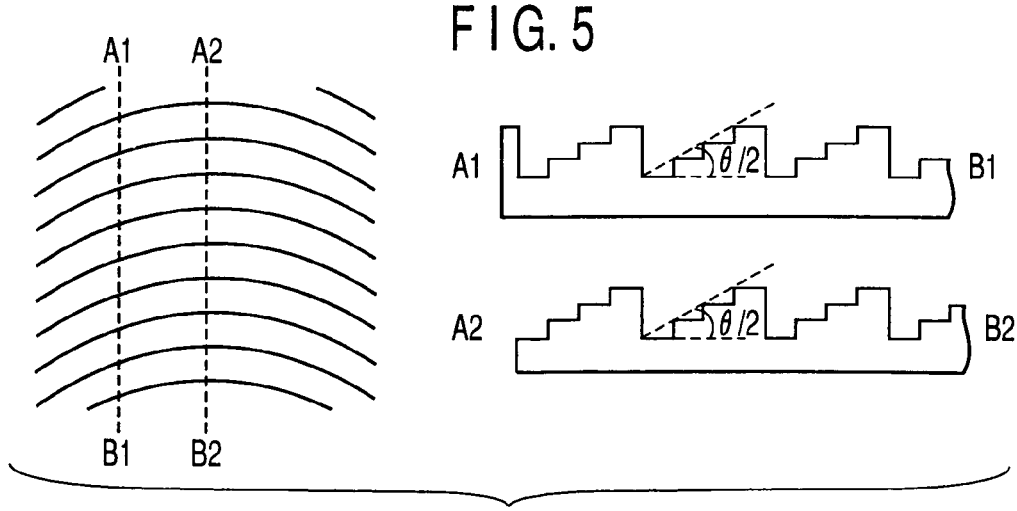
FIG. 6 is a schematic illustration of binary type diffraction gratings according to the first embodiment.

FIG. 6 illustrates binary type diffraction gratings containing a step like profile. In this case again, strong diffracted light is directed toward the front surface of the display device when the angular components of the slope of the gratings in the vertical direction of the slope of gratings are invariable (and equal to θ/2 in this case). In FIG. 6, the cross sectional view taken along line A1-B1 and the one taken along line A2-B2 run in the direction along which identical curved lines are arranged in parallel. It will be appreciated that the slope of the gratings shows the same angle regardless of the line along which a cross sectional view is taken.

Figures 7, 8:
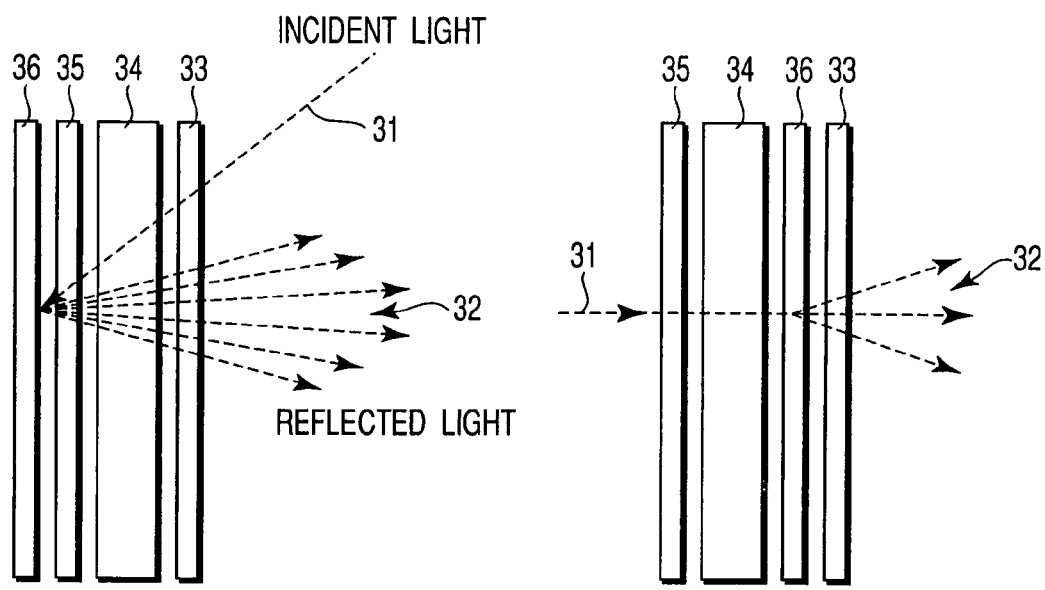
FIG. 7 is a schematic illustration of a reflection type liquid crystal display device comprising the optical diffusion film according to the first embodiment.
FIG. 8 is a schematic illustration of a transmission type liquid crystal display device comprising the optical diffusion film according to the first embodiment.

FIG. 7 is a schematic illustration of a reflection type liquid crystal display device comprising the optical diffusion film according to the first embodiment. The optical diffusion film of FIG. 7 is a reflection type optical diffusion film comprising an optical reflection layer formed on the surface of diffraction grating cell array by evaporation or sputtering. FIG. 7 shows a reflection type display device comprising a liquid crystal display layer and an optical diffusion film arranged at the side opposite to the front surface of the liquid crystal display layer for displaying an image to the viewers.

Generally, in such a reflection type display device, incident light 31 from a light source arranged under the ceiling of the room or from the sun is made to pass through a polarization panel 33, liquid crystal display layer 34 and polarization panel 35 and diffused and reflected by an optical diffusion film 36. Reflected light 32 is then made to pass through the polarization panel 35, liquid crystal display layer 34 and polarization panel 33 to make the viewers visually recognize the displayed image.

In the case of a display device such as a reflection type display device that does not require the use of a specifically provided light source and is for utilizing environmental light, generally, incident light 31 comes down obliquely from above as shown in FIG. 7. Therefore, when the optical diffusion film 36 comprises blazed type diffraction gratings or binary type diffraction gratings, the slopes are preferably directed toward the top (ceiling) of the display device.

While FIG. 7 shows a reflection type liquid crystal display device for utilizing environmental light, the first embodiment is applicable to a display device of a type adapted to obtain display light by reflecting edge light. Furthermore, the first embodiment is not limited to a reflection type display device but also applicable to a transmission type display device comprising a light transmitting film formed of an optical diffusion film not provided with a light reflection layer. In the case of a transmission type display device, the optical diffusion film 36 is arranged between the liquid crystal display layer 34 and the polarization layer 33 as shown in FIG. 8.

Meanwhile, in recent years, there has been a technological development for improving the aperture ratio of liquid crystal cells of a liquid crystal display device by causing the drive electrode located below the liquid crystal display layer (at the side opposite to the viewers as viewed from the liquid crystal display layer) to operate as a reflection layer (the electrode being to be referred to as a reflection electrode hereinafter). The reflection electrode may have a mirror surface or a surface provided with fine circular undulations. When the reflection electrode has a mirror surface, no diffusion of light takes place at the electrode and hence it is necessary to broaden the range of outgoing display light by using some other part. When, on the other hand, the reflection electrode has a surface provided with fine circular undulations, the diffusion of light is not sufficient and it is difficult to control the diffusion angle.

Therefore, it is effective to apply an optical diffusion film of the first embodiment to a liquid crystal display device comprising a reflection electrode. For example, an optical diffusion film comprising a plurality of light scattering diffraction grating cells may be arranged on the reflection surface of the reflection electrode. Alternatively, diffraction grating cells of the first embodiment may be formed on the reflection surface of the reflection electrode. In view of the fact that an optical diffusion film according to the present invention comprises a glass or silicon substrate carrying thereon blazed type or binary type diffraction grating cells arranged in the form of a matrix and the reflection electrode of a liquid crystal display device is normally made by forming an electrode pattern on the surface of a glass or silicon substrate, it will be possible to control the reflection characteristics of the reflection electrode by forming undulations on the surface thereof. Since diffraction gratings change the diffraction angle depending on the wavelength of light that strikes them, white or almost white light can be obtained by changing the cycle of arrangement of diffraction gratings within a relatively narrow range. Stated another way, the influence of scattered wavelengths can be avoided to obtain white or almost white light by mixing rays of diffracted light showing different wavelengths. Alternatively, white or almost white light can be obtained by using a small diffraction angle for the diffraction gratings in order to reduce the coloring problem.

If the reflection electrode is sufficiently small and each of its sides is smaller than 0.3 mm, it is not necessary to arrange a plurality of diffraction grating cells in each electrode. In other words, the advantages of this embodiment can be secured by arranging a single diffraction grating cell in each electrode and forming a diffraction grating cell array as a collection of electrodes (and hence diffraction grating cells).

When a diffraction grating cell array (optical diffusion film) is formed by arranging a number of diffraction grating cells having an effect of scattering light and if the gratings of the diffraction grating cells are interrupted at the boundaries of the cells, the effect of control light by diffraction is weakened there. Meanwhile, most display devices such as liquid crystal display devices comprise pixels that are separated by gaps. In the case of a liquid crystal display device, the black matrix surrounding the liquid crystal cells as a non-pixel component provides such gaps. Then, light from the pixels can be used efficiently by arranging an optical diffusion film comprising blazed type (or binary type) diffraction grating cells on the image display surface of the display device carrying pixels thereon in such a way that the diffraction grating cells are located at positions corresponding to the pixels. Such an arrangement can effectively prevent the light controlling effect of the display device from being weakened by diffraction along the boundaries of the diffraction grating cells.

Now, the method of manufacturing an optical diffusion film will be described below. A patterning device that is used for manufacturing semiconductor devices can be used for accurately forming blazed type or binary type diffraction gratings that are curved. With such a device, a pattern is formed by converging or scanning an electron beam or a laser beam.

Figure 9:
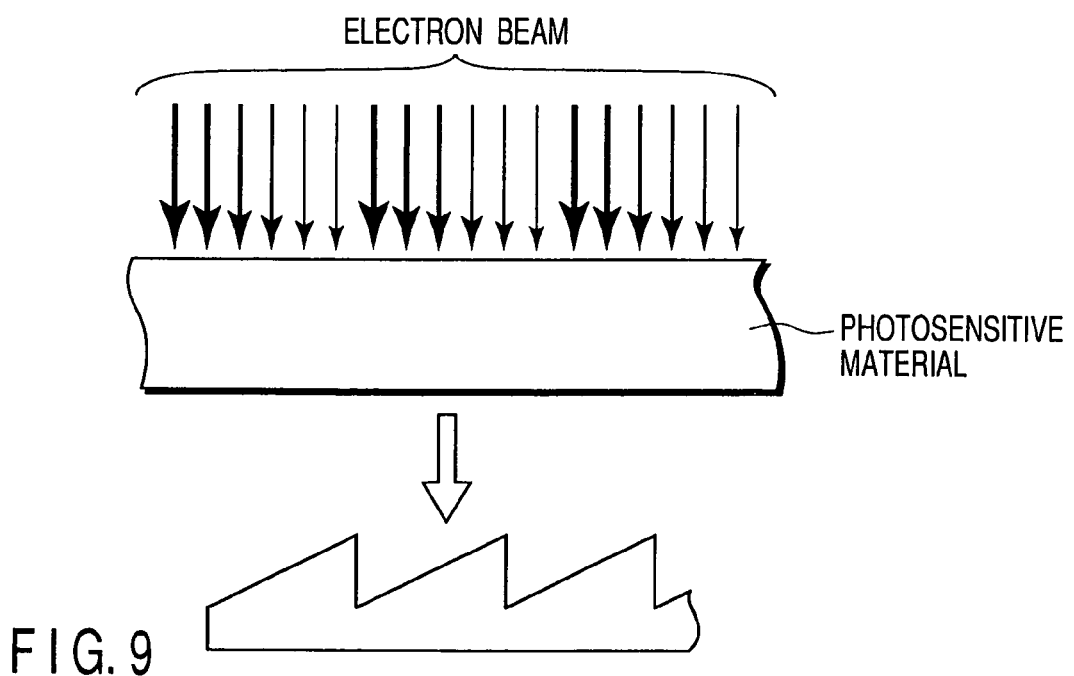
FIG. 9 is a schematic illustration showing the process of preparing blazed type diffraction gratings.

FIG. 9 is a schematic illustration of the process of preparing blazed type diffraction gratings. Saw-tooth like gratings can be formed by gradually changing the amount of energy applied to an area of a photosensitive material by irradiating an electron beam there and hence the depth of the gratings in a controlled manner. In FIG. 9, the width of each arrow represents the level of applied energy. The gratings show a large depth in areas where a large amount of energy is applied. The intensity of irradiation of an electron beam (the amount of applied energy) can be modulated by directly controlling the dose, by changing the scanning speed (time) or by changing the number of scans when the same area is scanned for a plurality of times. It will be appreciated that the above description holds true for binary type gratings.

When a laser beam is used, blazed type or binary type diffraction gratings can be formed by changing the amount of energy applied to an area of a photosensitive material.

Figure 10A:
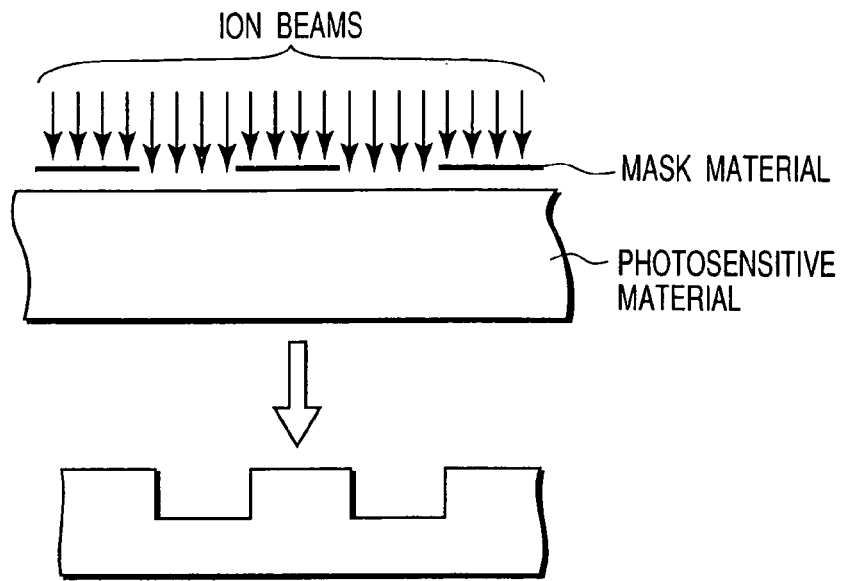
FIG. 10A and FIG. 10B are schematic illustrations showing the process of preparing binary type diffraction gratings.
Figure 10B:
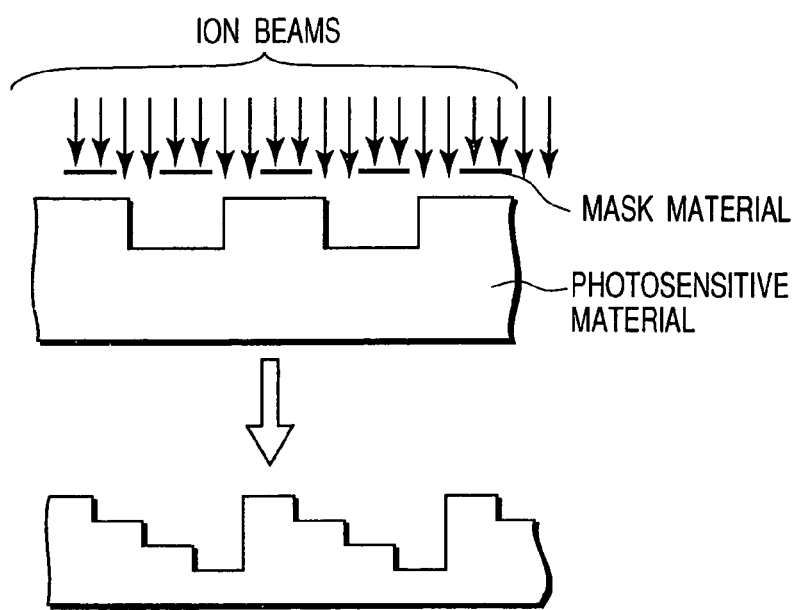

Diffraction gratings can be formed by methods other than those using an electron beam or a laser beam. FIG. 10A and FIG. 10B are schematic illustrations of the process of preparing binary type diffraction gratings having four steps by etching using ion beams. Binary type diffraction gratings having four steps can be prepared by carrying out two etching operations using two different types of mask patterns that are different in terms of pitch and size. Firstly, as shown in FIG. 10A, a photosensitive material is selectively etched by using ion beams caused to pass through the openings of a first mask pattern arranged at a first pitch (cycle) and having a first size (equal to the cycle). Rectangle recesses corresponding to the openings of the mask pattern are formed in the photosensitive material. Then, as shown in FIG. 10B, the photosensitive material that have been subjected to the first etching operation is selective etched again by using ion beams caused to pass through the openings of a second mask pattern arranged at a second pitch that is a half of the first pitch and having a second size that is a half of the first size. As a result, stepped recesses are formed in the photosensitive material. More specifically, stepped recesses having $2^2=4$ steps are formed by using two mask patterns. In other words, binary type diffraction gratings having an increased number of steps ($2^n$:n being the number of mask patterns) can be formed by increasing the number of mask patterns and the number of etching operations.

It will be needless to say that blazed type diffraction gratings can also be formed by etching using ion beams.

After preparing an original plate by developing the photosensitive material carrying diffraction gratings of a desired pattern on the surface thereof as shown in FIGS. 9, 10A and 10B, a stamper carrying a replica of the diffraction gratings of the original plate is prepared typically by plating, using the original plate. A large number of copies of the diffraction gratings can easily be formed on thermoplastic resin films by embossing, using the stamper.

However, it should be noted here that, while optical diffusion films can be formed at low cost by using thermoplastic films, the level of precision of forming fine diffraction gratings on thermoplastic resin films by embossing faces a certain limit. The use of photosensitive resin (photo-setting type resin) is preferable for forming finer diffraction gratings with a higher level of precision.

As described above in detail, with the first embodiment of the present invention, it is possible to select the range (view area) of light emission by utilizing a diffraction effect of light. Therefore, there is provided an optical diffusion film that can increase the ratio of emitting light to a particular area relative to incident light, or the efficiency of utilization of light, to display a bright image when compared with any conventional optical films only adapted to non-directional diffusion (scattering). An optical diffusion film according to the first embodiment is thin and lightweight and can be produced at low cost. According to the first embodiment, there is also provided a display device comprising such an optical diffusion film. Additionally, since the profile, the pitch and the depth of diffraction gratings of an optical diffusion film according to the first embodiment can vary on an area by area basis, a single optical diffusion film can have a plurality of functions including controlling the spreading angle of light by changing the direction of emission of light as shown in FIG. 7. Additionally, a display device according to the first embodiment can be prepared with a reduced number of optical members to lower the manufacturing cost thereof. Still additionally, since an optical diffusion film according to the first embodiment comprises blazed type or binary type diffraction gratings, it is possible to raise the ratio of converting incident light into diffracted light, or the efficiency of utilization of light, to nearly 100%. Finally, since external light can be utilized highly efficiently, it is no longer necessary to provide the display device with an internally contained light source so that it can be made thinner than ever.

Other embodiments of the optical diffusion film according to the present invention will be described. The same portions as those of the first embodiment will be indicated in the same reference numerals and their detailed description will be omitted.

Second Embodiment

While a display device to which the optical diffusion film of the first embodiment is applied may be a reflection type liquid crystal display device or a transmission type liquid crystal display device, an optical diffusion film of the second embodiment is designed to be used for a display device of a type realized by combining the above two types. More specifically, such a combined type display device is adapted to use only external light for displaying images when the environment of the display device is sufficiently light but use the back light for displaying images when the environment of the display device is dark. Therefore, the display device shows a high efficiency of utilization of light and, at the same time, is highly power-saving. Such a display device can particularly suitably be used for the display of a mobile terminal such as a mobile telephone set or a mobile PC.

Figure 11:
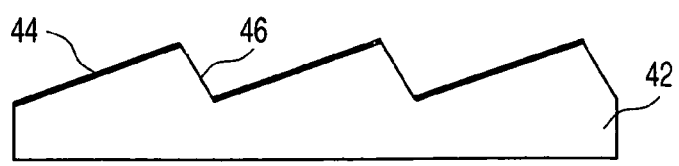
FIG. 11 is a schematic cross sectional view of an optical diffusion film according to a second embodiment of the present invention.

FIG. 11 is a schematic cross sectional view of an optical diffusion film according to the second embodiment of present invention, illustrating a diffraction grating cell array 42 of blazed type diffraction gratings having slopes 44, 46 that are formed asymmetrically. Of the two slopes, only the gentle slope (the long slope) 44 is provided with a reflection layer adapted to operate for total reflection. The reflection layer is made by forming a thin film layer of metal such as aluminum or dielectric by evaporation, although any other appropriate technique may be used for forming the reflection layer.

Figures 12, 13:
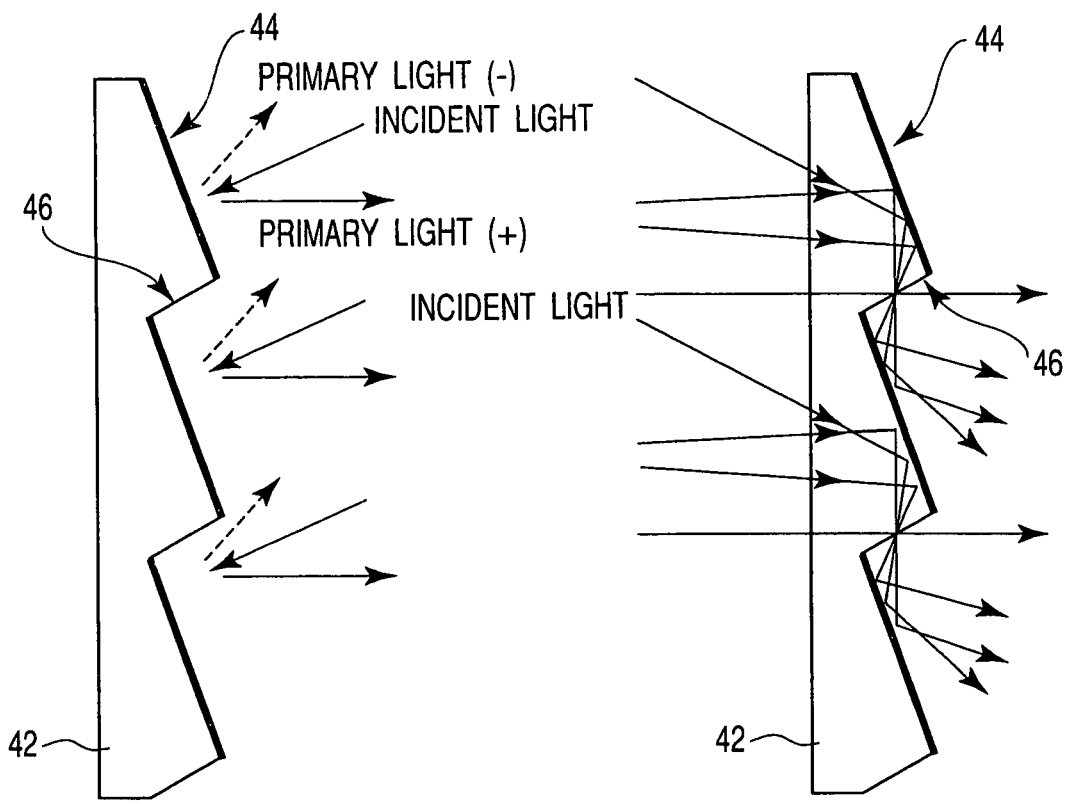
FIG. 12 is a schematic illustration showing an effect of reflection of light according to the second embodiment.
FIG. 13 is a schematic illustration showing an effect of transmission of light according to the second embodiment.

As shown in FIG. 12, when viewed from an oblique view area located above the diffraction grating cell array 42, the slope 46 does not operate for producing diffracted light directed toward the view area. In other words, the embodiment of optical diffusion film operates as reflection type optical diffusion film with which the viewers can see highly bright diffracted light in the view area regardless if the slope 46 has a reflection layer or not. On the other hand, the slope 46 can transmit light including light entering the diffraction grating cells.

Thus, the slope 44 provided with a reflection layer for reflecting incident light coming obliquely from above operates as diffraction gratings and hence can reflect strong diffracted light toward a specific view area. This means that the display device can display clear images by using light coming from one or more than one internal light sources and/or environmental light such as natural light.

FIG. 13 is a schematic illustration of the optical effect of transmitting light of the second embodiment when it is used a transmission type optical diffusion film. Referring to FIG. 13, incident light coming from behind is reflected by the rear surface of the reflection plane 44, reflected light is incident on the front surface of an adjacent reflection plane 44, and reflected light goes out from the optical diffusion film. Some incident light may be transmitted directly through the transmission plate 46.

Figure 14:
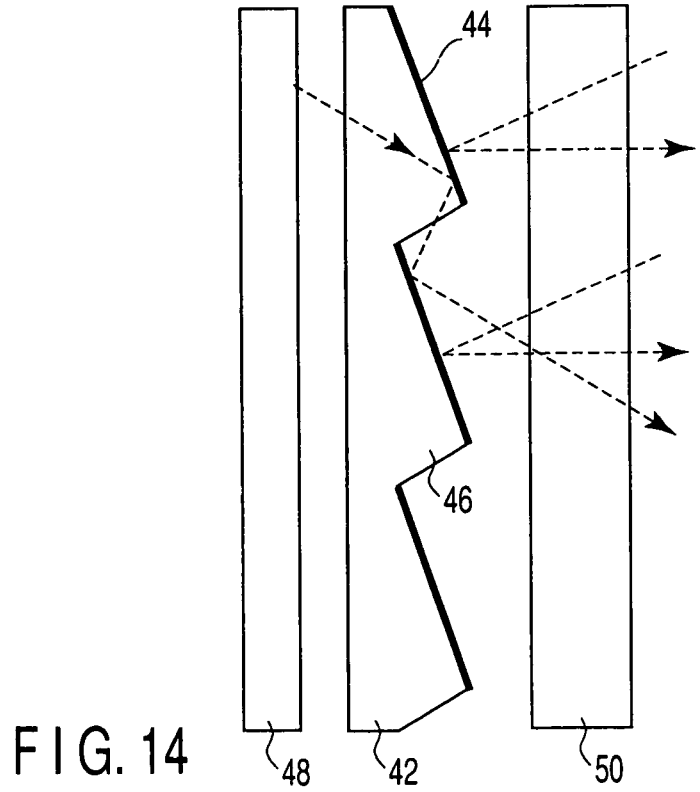
FIG. 14 is a schematic illustration of a combined reflection/transmission type liquid crystal display device comprising the optical diffusion film according to the second embodiment.
Figure 17:
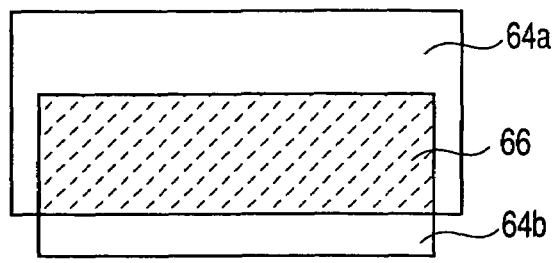
FIG. 17 is a schematic illustration of the overlap of the distributions of primary diffracted light for two different wavelengths from a cell of the optical diffusion film according to the third embodiment.

FIG. 14 is a schematic illustration of a combined reflection/transmission type liquid crystal display device comprising the optical diffusion film of the second embodiment. A back light layer 48 is arranged as light source behind a liquid crystal display layer 50 with the optical diffusion film 42 disposed between them. When the back light layer 48 is turned off, environmental light coming obliquely from above is reflected by the reflection plane 44 and directed toward the view area so as to be viewed by the viewers as shown in FIG. 12. As the back light layer 48 is turned on, light from the back light layer 48 may be directly transmitted through the transmission plane 46 or reflected by the rear surface of the reflection plane 44, transmitted through the transmission plane 46, reflected by the front surface of the neighboring reflection plane 44 and then directed to the front view area so as to be viewed by the viewers as shown in FIG. 13. It may be needless to say that environmental light is also reflected toward the view area as shown in FIG. 12 when the back light layer 48 is turned on.

As in the first embodiment, an optical diffusion film of the second embodiment may be arranged on a driving electrode (reflective electrode) under the liquid crystal display layer.

There is provided a display device that allows the viewers to view the displayed images, using both light from an internal light source and environmental light by using the optical diffusion film of the second embodiment. The second embodiment may be realized by using binary type diffraction gratings having stepped slopes provided with a reflection layer to obtain a similar effect.

Third Embodiment

FIG. 15 is a schematic front view of a grating pattern of the optical diffusion film according to the third embodiment.

The optical diffusion film of this embodiment is formed by arranging a plurality of diffraction grating cells 62 in the form of a matrix. The diffraction grating cell 62 comprises a plurality of identical curved lines (in the form of a sector of a circle in FIG. 15) juxtaposed in parallel in a predetermined direction (in the vertical direction in FIG. 15).

The intervals ($d_y$ in FIG. 3) separating the juxtaposed gratings in each diffraction grating cell 62 are not equal but changed gradually. The profile of the curved lines of the diffraction gratings depends on the manner in which light is spread in a direction perpendicular to the direction of juxtaposition (horizontal direction in FIG. 15).

Like the above embodiments, either blazed type diffraction gratings or binary type diffraction gratings may be used for this embodiment. In other words, the third embodiment is realized by gradually changing the intervals of the diffraction gratings of the first embodiment shown in FIG. 2. The intervals of the diffraction gratings of the first embodiment are all equal to each other.

With the optical diffusion film of this embodiment, the light emission range (view area) thereof can be appropriately selected because, as light enters it, diffracted light (mainly primary diffracted light) is spread and emitted to a specific area by the optical effect of diffracting light of this embodiment as in the case of the first embodiment. Therefore, the efficiency of utilization of light in terms of incident light to a specific area can be remarkably improved when compared with any conventional optical films only adapted to non-directional diffusion (scattering).

Additionally, the intensity distribution of light in the specific area can be made uniform by appropriately selecting the size and the type of diffraction gratings 2 of the diffraction grating cells 62 of the optical diffusion film 4. More specifically, it can be made uniform by filling the gaps of rays of primary diffracted light from the diffraction gratings of different types, utilizing the spread of diffracted light that depends on the sized of the cells.

As a result, when the image shown on the display device is viewed from the specific area, it is recognized by the viewers by means of uniformly bright light.

If the viewers move to change their viewing angles, light can be recognized stably so long as they are located within the specific area.

Since surface relief type diffraction gratings are used as the diffraction gratings, they can be made at low cost on a mass production basis by embossing. Additionally, such a display device is compact and adapted to be made thin and light weight and can be marketed at low cost.

When this embodiment is used as a reflector film, external light can be utilized highly efficiently so that the display device is not required to contain a light source. Therefore, the display device can be made highly compact.

The intervals separating the diffraction gratings of each diffraction grating cell 62 are made to change continuously in the direction of juxtaposition in this embodiment. Therefore, diffracted light can be spread three-dimensionally and emitted not only in the horizontal direction that is perpendicular to the direction of juxtaposition but also in the direction of juxtaposition (vertical direction).

Then, the range of emission of diffracted light in the direction of juxtaposition (vertical direction) depends on the intervals separating the diffraction gratings contained in each diffraction grating cell 62 and the range of emission of diffracted light in the direction (horizontal direction) perpendicular to the direction of juxtaposition depends on the curved profile of the diffraction gratings. Therefore, it is possible to form an optical diffusion film adapted to provide a given emission range by appropriately arranging diffraction grating cells 62.

The local intervals $d_y$ separating the diffraction gratings in each cell are so selected as to make the tangent of the diffraction angle $\alpha_y$ or the diffraction angle $\alpha_y$ itself change stepwise by a given constant value.

FIG. 16A and FIG. 16B are schematic illustration of the distribution of primary diffracted light from the diffraction grating cell 62 of the optical diffusion film of the third embodiment. FIG. 16A shows the range 64a of diffracted light obtained from incident light with a wavelength of $\lambda_1$, whereas FIG. 16B shows the range 64b of diffracted light obtained from incident light with a wavelength of $\lambda_2$ that is different from the wavelength $\lambda_1$.

With this arrangement, there is a region 66 where two different types of diffracted light from a single diffraction grating cell overlap each other. While two different wavelengths are used in the above description for the purpose of simplicity, it will be appreciated that an overlapping area is produced when three or more than three wavelengths are involved.

Figure 18:
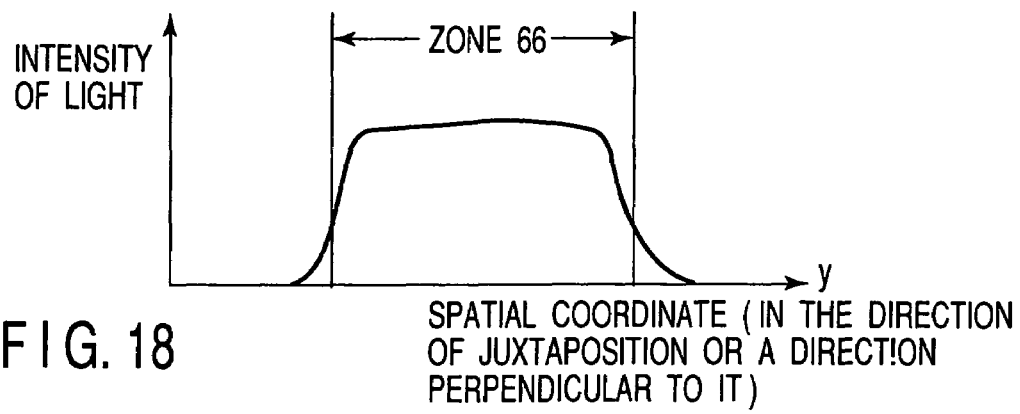
FIG. 18 is a graph illustrating the distribution of the intensity of primary diffracted light from a single cell of the optical diffusion film according to the third embodiment.

FIG. 18 is a graph illustrating the distribution of the intensity of primary diffracted light from a single diffraction grating cell of the optical diffusion film of the third embodiment and observed in the vertical direction. The intensity of diffracted light is uniform for a given wavelength in the region 66.

Therefore, as white light strike the optical diffusion film, a plurality of wavelength components coexist in the area where the ranges of emission of diffracted light with the plurality of different wavelengths overlap so that the area is observed as white light by the viewers. If the viewers move to change their viewing angles, light with different wavelengths can be recognized in respective specific areas both in the direction of juxtaposition and in the horizontal direction that is perpendicular to the direction of juxtaposition to consequently broaden the overall view area.

While the intervals of the diffraction gratings of the third embodiment are changed continuously in the direction of juxtaposition, this embodiment is by no means limited thereto and the intervals of the diffraction gratings may alternatively be changed discontinuously (intermittently) or large and small intervals may be arranged randomly.

Thus, with the third embodiment, it is possible to appropriately select a range of light emission (view area), utilizing the optical effect of diffracting light and the intensity distribution of light in the specific area can be made uniform. Furthermore, the optical diffusion film of this embodiment provides highly bright images by raising the efficiency of utilization of light. Thus, the optical diffusion film of this embodiment can be made very thin and lightweight at low cost.

Fourth Embodiment

While the intervals of the diffraction gratings of each diffraction grating cell of the third embodiment are changed to spread and emit diffracted light three-dimensionally including the direction of juxtaposition (vertical direction), the intervals of the diffraction gratings of each diffraction grating cell are made same and identical in the fourth embodiment. However, the intervals of the diffraction gratings are made to vary from cell to cell to consequently change the intervals of diffraction gratings in the cell array as a whole.

The intervals $d_y$ separating the diffraction gratings in each cell are so selected as to make the tangent of the diffraction angle $\alpha_y$ or the diffraction angle $\alpha_y$ itself change stepwise by a given constant value.

Furthermore, the minimum difference of the intervals is made equal to or less than the half-width of diffracted light generated by the cell itself or less than the width of the spread of diffracted light generated by the cell itself. With this arrangement, the gaps in the distribution of diffracted light generated by the diffraction gratings of the diffraction grating cells are buried by spreading diffracted light generated by the diffraction grating cells themselves so that a substantially uniform distribution of intensity of light emitted from the diffraction grating cell array can be obtained in a specific area.

FIG. 20 is a graph illustrating the distributions of primary diffracted light from two cells when the difference in the intervals of the diffraction gratings fourth embodiment of optical diffusion film is less than the value corresponding to the half-width of light diffracted by the cell itself. The two distribution patterns indicated by solid lines in FIG. 20 show the distributions of diffracted light from separate diffraction grating cells. The broken line in FIG. 20 is obtained by synthesizing the two distribution patterns. As in the case of the third embodiment, the intensity of light can be held to a constant level in a specific zone (vertical direction).

FIG. 21 is a graph illustrating the distributions of primary diffracted light from two cells when the difference in the interval of the diffraction gratings of optical diffusion film is less than the value corresponding to the full-width of light diffracted by the cell itself. The two distribution patterns indicated by solid lines in FIG. 21 show the distributions of diffracted light from separate diffraction grating cells. The two distribution patterns indicated by dot-and-dashed lines in FIG. 21 show the distributions of diffracted light from separate diffraction grating cells when the angular distribution of incident light has a certain width. The broken line in FIG. 21 is obtained by synthesizing the two distribution patterns indicated by the dot-and-dashed lines. As in the case of the third embodiment, the intensity of light can be held to a constant level in a specific zone (vertical direction).

As seen from the above description, the fourth embodiment provides advantages that are similar to those of the third embodiment.

Figure 19:
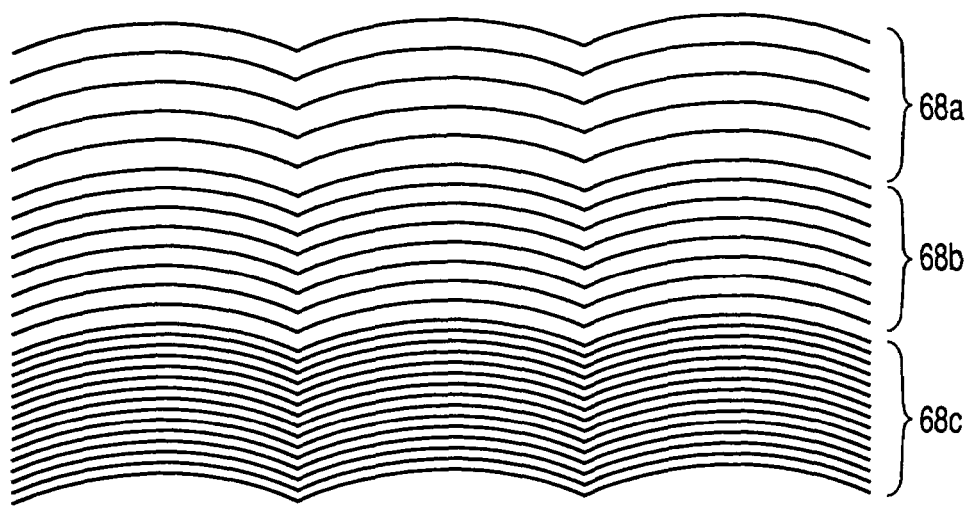
FIG. 19 is a schematic front view of an example of a grating pattern of an optical diffusion film according to a fourth embodiment of the present invention.

While the fourth embodiment is described in terms of the intervals of the diffraction gratings that continuously differ from a diffraction grating cell to another in the direction of juxtaposition, the embodiment is by no means limited thereto. For example, the intervals of the diffraction gratings may be changed discontinuously (intermittently) in the direction of juxtaposition or large and small intervals may be arranged randomly. Furthermore, while the intervals of the diffraction gratings are made same and identical in the cells of each row in FIG. 19, this embodiment is by no means limited thereto and large and small intervals may be arranged randomly in the cell arrays.

FIG. 20 and FIG. 21 are graphs illustrating the distribution of diffracted light coming from two diffraction grating cells. However, a similar phenomenon can be obtained when diffracted light coming from three or more than three diffraction grating cells are used. A uniform distribution pattern of diffracted light can be obtained over a wide range as the number of cells providing respective distribution patterns that overlap each other increases.

Fifth Embodiment

FIG. 22 is a schematic perspective view of a display device according to the fifth embodiment that comprises an optical diffusion film 70 of the above described third or fourth embodiment at the back of a display member 72 for displaying images by controlling transmitted light, which may be a liquid crystal display device.

With this arrangement, a transmission type display device is realized and viewed as uniformly bright area from a selected light emission range (view area).

Alternatively, a transmission type optical diffusion film of the third or fourth embodiment may be arranged in front of the transmission type display member.

Still alternatively, a reflection type display device may be realized by arranging an optical diffusion film of the third or fourth embodiment opposite to the front surface of a reflection type display member adapted to control the reflection of light for displaying images.

Thus, with the fifth embodiment, it is possible to appropriately select a range of light emission (view area), utilizing the optical effect of diffracting light and the intensity distribution of light in the specific area can be made uniform. Furthermore, the display device of this embodiment can provide highly bright images by raising the efficiency of utilization of light. Thus, the display device of this embodiment can be made very thin and lightweight at low cost.

Sixth Embodiment

Figure 23A:
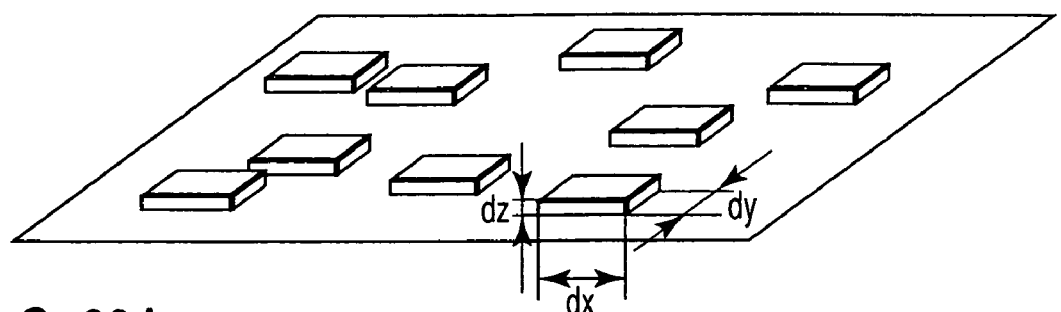
FIG. 23A is a schematic front view of an example of an optical scattering film having light scattering elements having fine undulations.
Figure 23B:
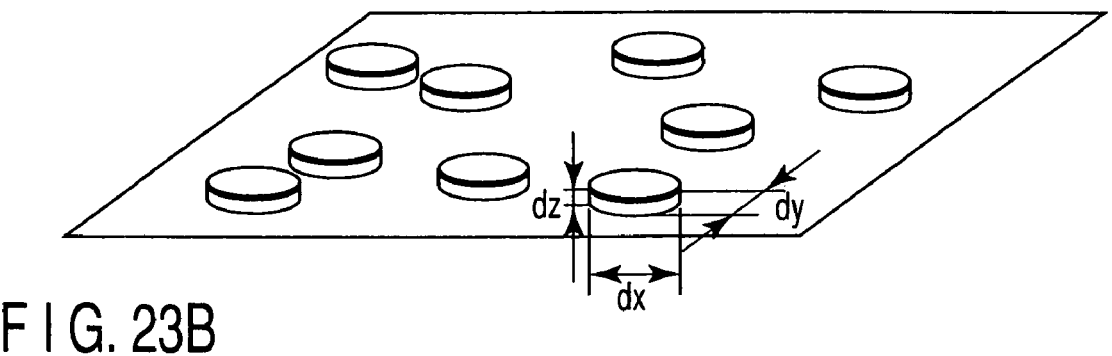
FIG. 23B is a schematic front view of another example of an optical scattering film having light scattering elements having fine undulations.

Techniques for scattering light by forming light scattering elements of fine recesses or projections that are different from diffraction gratings on a substrate (processing a substrate to from fine undulations) and roughening the surface of the substrate are known. FIG. 23A is a schematic front view of an optical diffusion film having light scattering elements formed by fine box like projections. FIG. 23B is a schematic front view of another optical diffusion film having light scattering elements formed by fine elliptic projections. The projections may be replaced by so many recesses.

Conventionally, such undulations are formed by roughening the surface by etching or by using a chemical. However, with such techniques, it is difficult to change the degree of scattering light by changing the extent of projections or recesses formed in respective fine areas on the surface of the substrate.

However, it is possible to carry out a patterning operation on the surface of a substrate by using a patterning device that is used in a semiconductor manufacturing process as described earlier by referring to the first embodiment and controlling the dimensional ratios and the profile of the recesses or projections formed on the surface. The light scattering elements preferably contain an eccentric surface profile having a short axis and a long axis (such as that of a box or an ellipse) and are formed on a flat substrate as recesses or projections. The light scattering effect of the light scattering elements in the direction perpendicular to the short and long axes can be controlled by modifying length of the short axis and that of the long axis. Light of a specific wavelength is prevented from being intensified in a specific direction and the distribution of scattered light can be made continuous by randomly arranging light scattering elements. Then, white light is used for the purpose of lighting, scattered light can be made also white. The intensity of scattered light produced by a light scattering member can be modified by changing the density of light scattering elements in the light scattering member and/or the depth (height) of the undulations of the light scattering body. Thus, extent of scattering light (in terms of angle and the intensity of reflected light) can be modified by controlling the dimensional ratios and the profile of the recesses or projections formed in the light scattering member.

Figure 24:
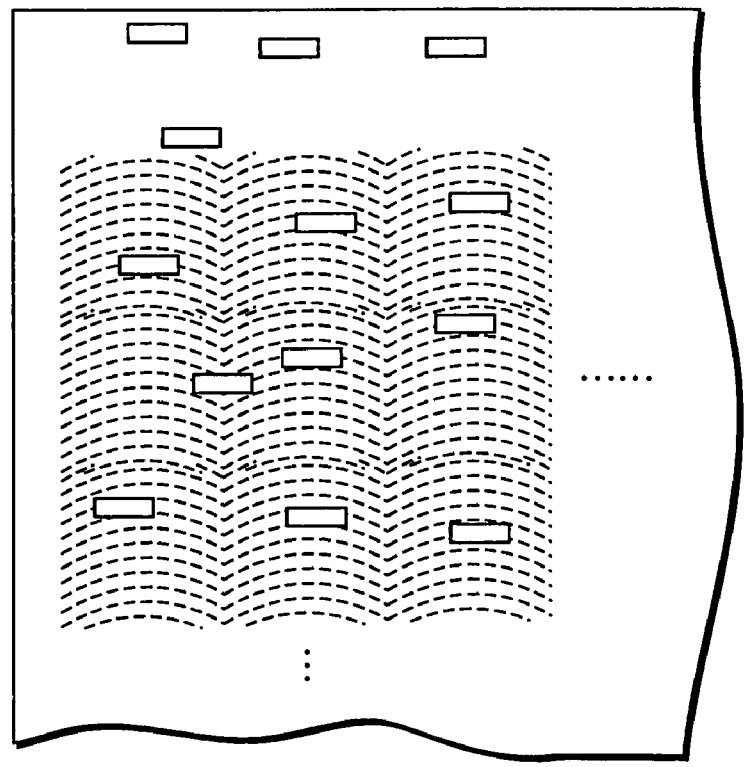
FIG. 24 is a schematic front view of an optical diffusion film according to a sixth embodiment of the present invention and comprising the optical scattering film shown in FIG. 23A or 23B.

A further improved light scattering effect can be expected by combining this embodiment of optical diffusion film and any of the other embodiments of the present invention. FIG. 24 is a schematic front view of the optical diffusion film of the sixth embodiment and illustrated in FIGS. 23A and 23B as combined with the diffraction grating cell array of the first embodiment. It will be appreciated that the short edges of the box shaped light scattering elements are arranged in the direction of juxtaposition of the diffraction gratings and the direction of scattering light of the diffraction gratings agree with that of the light scattering elements. Additionally, light scattering elements are formed outside the diffraction grating cells (along the periphery of the latter). However, it should be noted that the arrangement of light scattering elements is determined depending on the required optical performance thereof.

Additional advantages and modifications will readily occur to those skilled in the art. Therefore, the present invention in its broader aspects is not limited to the specific details, representative devices and illustrated examples shown and described herein. Accordingly, various modifications may be made without departing from the spirit or scope of the general inventive concept as defined by the appended claims and their equivalents. For example, while the above embodiments are described in terms of arranging diffraction grating cells in the form of a two-dimensional matrix, the present invention is by no means limited thereto and diffraction grating cells may alternatively be arranged in the form of an array (one-dimensional matrix). Similarly, while the above embodiments are described in terms of sector-shaped diffraction gratings that constitute diffraction grating cells, the present invention is by no means limited thereto and differently curved diffraction gratings may alternatively be used. Likewise, while the above embodiments are described in terms of liquid crystal display device, the present invention is also applicable to a plasma display or a CRT display.

What is claimed is:

1. A display device comprising:
    a liquid crystal display layer which comprises an array of pixels arranged in a matrix and forms an image to be displayed; and
    a light reflecting optical film which is arranged on a rear surface of the liquid crystal display layer, on substantially identical curved lines having a sector of a circle shape, the curved lines being separated at regular intervals, each interval having a horizontal component and a vertical component, and comprises an array of diffraction grating cells arranged in a matrix, each cell comprising blazed type or binary type curved gratings having the same profile and arranged in parallel,
    wherein each side of each diffraction grating cell measures between about 5 μm and about 300 μm, and
    wherein said diffraction grating cells are located at positions corresponding to the pixels.

2. The display device according to claim 1, wherein said gratings of different grating cells contain different profiles.

3. The display device according to one of claims 1 or 2, wherein said gratings of each of the grating cells include at least two grating pitches.

4. The display device according to one of claims 1 or 2, wherein an angle of a slope of the gratings of different grating cells is uniform.

5. The display device according to one of claims 1 or 2, wherein a surface of said diffraction grating cells of each of the grating cells is provided with a reflection layer.

6. The display device according to one of claims 1 or 2, wherein
    said liquid crystal display layer comprises an array of pixels arranged in a matrix; and
    a pitch of said array of diffraction grating cells is an integral multiple of a pitch of said array of said pixels or vice versa.

7. The display device according to one of claims 1 or 2, wherein each of the gratings of each of the grating cells has a gentle slope and a steep slope in a cross section and the gentle slope is directed to above a display screen of said display device.

8. A display device comprising:
    a liquid crystal display layer which comprises an array of pixels arranged in a matrix and forms an image to be displayed; and
    a light transmission optical film which is arranged on a front surface of the liquid crystal display layer on substantially identical curved lines having a sector of a circle shape, the curved lines being separated at regular intervals, each interval having a horizontal component and a vertical component, and comprises an array of diffraction grating cells arranged in a matrix, each cell comprising blazed type or binary type curved gratings having the same profile and arranged in parallel,
    wherein each side of each diffraction grating cell measures between about 5 μm and about 300 μm, and
    wherein said diffraction grating cells are located at positions corresponding to the pixels.

9. The display device according to claim 8, wherein said gratings of different grating cells contain different profiles.

10. The display device according to one of claims 8 or 9, wherein said gratings of each of the grating cells include at least two grating pitches.

11. The display device according to one of claims 8 or 9, wherein an angle of a slope of the gratings of different grating cells is uniform.

12. The display device according to one of claims 8 or 9, wherein
    said array of diffraction grating cells and said array of pixels show a one-to-one correspondence.

13. The display device according to one of claims 8 or 9, wherein
    said liquid crystal display layer comprises an array of pixels arranged in a matrix; and
    a pitch of said array of diffraction grating cells is an integral multiple of a pitch of said array of said pixels or vice versa.

14. The display device according to one of claims 8 or 9, wherein each of the gratings of each of the grating cells has a gentle slope and a steep slope in a cross section and the gentle slope is directed to above a display screen of said display device.

15. A display device comprising:
    a liquid crystal display layer which comprises an array of pixels arranged in a matrix and forms an image to be displayed; and
    a light reflecting optical film which is arranged on a rear surface of the liquid crystal display layer on substantially identical curved lines having a sector of a circle shape, the curved lines being separated at regular intervals, each interval having a horizontal component and a vertical component and comprises an array of diffraction grating cells arranged in a matrix, each cell comprising curved gratings having the same profile and arranged in parallel,
    wherein said gratings of each of the grating cells include at least two grating pitches,
    wherein each side of each diffraction grating cell measures between about 5 μm and about 300 μm, and
    wherein said diffraction grating cells are located at positions corresponding to the pixels.

16. The display device according to claim 15, wherein said gratings of different grating cells contain different profiles.

17. The display device according to one of claims 15 or 16, wherein an angle of a slope of the gratings of different grating cells is uniform.

18. The display device according to one of claims 15 or 16, wherein a surface of said diffraction grating cells of each of the grating cells is provided with a reflection layer.

19. The display device according to one of claims 15 or 16, wherein each of the gratings of each of the grating cells has a gentle slope and a steep slope in a cross section and a surface of the gentle slope is provided with a reflection layer.

20. The display device according to one of claims 15 or 16, wherein
    said array of diffraction grating cells and said array of pixels show a one-to-one correspondence.

21. The display device according to one of claims 15 or 16, wherein
- said liquid crystal display layer comprises an array of pixels arranged in a matrix; and
- a pitch of said array of said diffraction grating cells is an integral multiple of a pitch of said array of said pixels or vice versa.

22. The display device according to one of claims 15 or 16, wherein each of the gratings of each of the grating cells has a gentle slope and a steep slope in a cross section and the gentle slope is directed to above a display screen of said display device.

23. A display device comprising:
- a liquid crystal display layer which comprises an array of pixels arranged in a matrix and forms an image to be displayed; and
- a light transmission optical film which is arranged on a front surface of the liquid crystal display layer on substantially identical curved lines having a sector of a circle shape, the curved lines being separated at regular intervals, each interval having a horizontal component and a vertical component, and comprises an array of diffraction grating cells arranged in a matrix, each cell comprising curved gratings having the same profile and arranged in parallel,
- wherein said gratings of each of the grating cells are arranged by at least two pitches,
- wherein each side of each diffraction grating cell measures between about 5 μm and about 300 μm, and
- wherein said diffraction grating cells are located at positions corresponding to the pixels.

24. The display device according to claim 23, wherein said gratings of different grating cells contain different profiles.

25. The display device according to one of claims 23 or 24, wherein an angle of a slope of the gratings of different grating cells is uniform.

26. The display device according to one of claims 23 or 24, wherein said array of diffraction grating cells and said array of pixels show a one-to-one correspondence.

27. The display device according to one of claims 23 or 24, wherein
- said liquid crystal display layer comprises an array of pixels arranged in a matrix; and
- a pitch of said array of said diffraction grating cells is an integral multiple of a pitch of said array of said pixels or vice versa.

28. The display device according to one of claims 23 or 24, wherein each of the gratings of each of the grating cells has a gentle slope and a steep slope in a cross section and the gentle slope is directed to above a display screen of said display device.

29. A display device comprising:
- a liquid crystal display layer which comprises any array of pixels arranged in a matrix and forms an image to be displayed;
- a plurality of drive electrodes in proximity to the liquid crystal display layer; and
- a light reflecting optical film formed on substantially identical curved lines having a sector of a circle shape, the curved lines being separated at regular intervals, each interval having a horizontal component and a vertical component, and including a plurality of diffraction grating cells arranged in a matrix, each of the diffraction grating cells including at least one of a blazed type and a binary type grating having the same profile and arranged in parallel,
- wherein the drive electrodes form the light reflecting optical film,
- wherein each of the drive electrodes includes one of the diffraction grating cells,
- wherein each side of each diffraction grating cell measures between about 5 μm and about 300 μm, and
- wherein said diffraction grating cells are located at positions corresponding to the pixels.

* * * * *